G. Berkstresser,
Churn.

Nº 94,176.          Patented Aug. 31. 1869.

Witnesses:
E. R. Brown
Gacsmith.

Inventor:
G. Berkstresser
By J. C. Theaker
his attorney.

United States Patent Office.

GEORGE BERKSTRESSER, OF BEDFORD, PENNSYLVANIA.

Letters Patent No. 94,176, dated August 31, 1869.

IMPROVEMENT IN CHURNS.

The Schedule referred to in these Letters Patent and making part of the same.

*To all whom it may concern:*

Be it known that I, GEORGE BERKSTRESSER, of Bedford, in the county of Bedford, and State of Pennsylvania, have invented a new and useful Improvement in Churns; and I do hereby declare that the following is a full, clear, and exact description thereof, reference being had to the accompanying drawings, in which—

Figure 1:
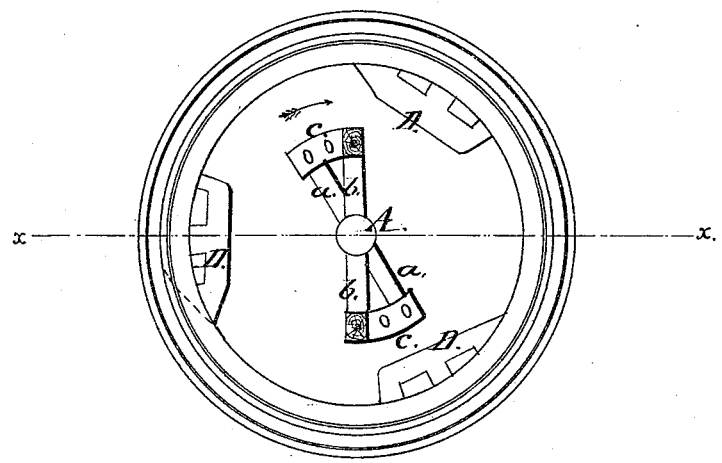
Figure 1 is a top view of my improved churn, with the lid removed.
Figure 2:
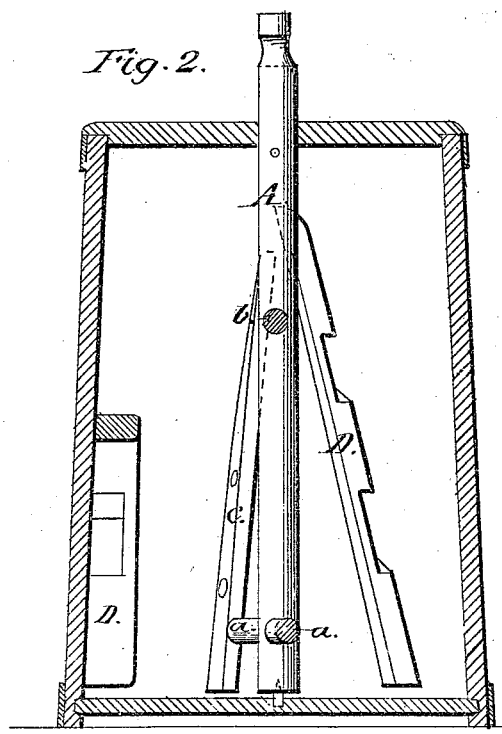
Figure 2 is a central vertical section, taken in the line $x\,x$, fig. 1.

The nature of my invention consists in the peculiar arrangement on the inside of a churn of a series of ribs or breakers, in such position, with relation to the dasher, as to give a downward rotary motion to the cream when the dasher is rotated, and to force air into the cream at the same time.

To enable those skilled in the art to which my invention appertains to make and use the same, I will proceed to describe its construction and operation.

In the drawings—

A represents the dasher, consisting of a vertical shaft, from which radiate one or more pairs of arms, $a\,b$. The arm $a$ is placed near the lower end of the shaft, and the arm $b$, if used, near the upper end, and at a different radius from the arm $a$. The ends of the arms $a\,b$ are connected by a bar $c$, which has an inclined direction, owing to the different relative angles at which the arms $a\,b$ are placed.

On the inside of the churn are secured three or more breakers, D, arranged in an inclined direction, the reverse of that of the bar $c$. The bar $c$ and breakers D are perforated, as shown in the drawings.

As the dasher is rotated in the direction of the arrow, the arrangement of the dasher and breakers, with relation to each other, is such as to force the air downward into the cream, and to give the cream a downward rotary motion, which motion is increased as the bar $c$, in its revolution, passes the breakers, and throws the cream against them with increased force, and, by reversing the direction of rotation, the butter will be gathered speedily.

Having thus described my invention,

What I claim as new, and desire to secure by Letters Patent, is—

The dasher A, when constructed with spiral beaters $c$, as shown and described, in combination with the oppositespirally-curved stationary beaters D and churn-body, all arranged as described.

G. BERKSTRESSER.

Witnesses:
E. R. BROWN,
G. A. C. SMITH.